United States Patent
Faith et al.

(10) Patent No.: US 11,941,591 B2
(45) Date of Patent: *Mar. 26, 2024

(54) DEVICE INCLUDING ENCRYPTED DATA FOR EXPIRATION DATE AND VERIFICATION VALUE CREATION

(71) Applicant: Visa International Service Association, San Francisco, CA (US)

(72) Inventors: Patrick Faith, Pleasanton, CA (US); Krishna Koganti, Cupertino, CA (US)

(73) Assignee: Visa International Service Association, San Francisco, CA (US)

( * ) Notice: Subject to any disclaimer, the term of this patent is extended or adjusted under 35 U.S.C. 154(b) by 257 days.

This patent is subject to a terminal disclaimer.

(21) Appl. No.: 17/227,154

(22) Filed: Apr. 9, 2021

(65) Prior Publication Data

US 2021/0233046 A1    Jul. 29, 2021

Related U.S. Application Data

(60) Continuation of application No. 16/171,176, filed on Oct. 25, 2018, now Pat. No. 11,004,043, which is a
(Continued)

(51) Int. Cl.
*G06Q 20/10* (2012.01)
*G06Q 20/38* (2012.01)
(Continued)

(52) U.S. Cl.
CPC ......... *G06Q 20/10* (2013.01); *G06Q 20/3821* (2013.01); *G06Q 20/383* (2013.01);
(Continued)

(58) Field of Classification Search
CPC .. G06Q 20/10; G06Q 20/3821; G06Q 20/383; G06Q 20/385; G06Q 40/02; H04L 9/32; H04L 2209/56; H04L 2209/805
See application file for complete search history.

(56) References Cited

U.S. PATENT DOCUMENTS 5,280,527 A    1/1994 Gullman et al.
5,613,012 A    3/1997 Hoffman et al.
(Continued)

FOREIGN PATENT DOCUMENTS

EP    1028401 A2    8/2000
EP    1921579       5/2008
(Continued)

OTHER PUBLICATIONS

Molloy, I.,et al. (2007). Dynamic Virtual Credit Card Numbers. Financial Cryptography and Data Security. FC 2007. Lecture Notes in Computer Science, vol. 4886. Springer, Berlin, Heidelberg. pp. 208-223. Retrieved on Nov. 7, 2023. Retrieved from URL:<https://doi.org/10.1007/978-3-540-77366-5_19> (Year: 2007).*
(Continued)

*Primary Examiner* — James M Detweiler
*Assistant Examiner* — Monica A Mandel
(74) *Attorney, Agent, or Firm* — Kilpatrick Townsend & Stockton LLP

(57) ABSTRACT

In order to make it more difficult to obtain numbers that can be used to conduct fraudulent transactions, a portion of a real account number is encrypted. The encrypted portion of the account number is used to generate a new account number, a new expiration date, and a new verification value. This information can be determined using processor that may reside in a point of sale terminal, a smart card, or a computer operated by a user. The new account number, the new expiration date, and the new verification value can be used in a payment transaction. A server computer in a central payment processing network may determine that the new account information is not the real account information, and may subsequently generate a modified authorization request message using the real account information and may send it to an issuer for approval. The transmission of data is more
(Continued)

secure, since real account information is not sent from the merchant to the payment processing network.

20 Claims, 7 Drawing Sheets

Related U.S. Application Data division of application No. 12/778,638, filed on May 12, 2010, now Pat. No. 10,140,598.

(60) Provisional application No. 61/179,970, filed on May 20, 2009.

(51) Int. Cl.
  *G06Q 40/02* (2023.01)
  *H04L 9/32* (2006.01)

(52) U.S. Cl.
  CPC .......... *G06Q 20/385* (2013.01); *G06Q 40/02* (2013.01); *H04L 9/32* (2013.01); *H04L 2209/56* (2013.01); *H04L 2209/805* (2013.01)

(56) References Cited

U.S. PATENT DOCUMENTS

| | | |
|---|---|---|
| 5,781,438 A | 7/1998 | Lee et al. |
| 5,883,810 A | 3/1999 | Franklin et al. |
| 5,930,767 A | 7/1999 | Reber et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,070,154 A | 5/2000 | Tavor et al. |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,453,301 B1 | 9/2002 | Niwa |
| 6,484,182 B1 | 11/2002 | Dunphy et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,212,635 B2 | 5/2007 | Nishikawa |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,587,502 B2 | 9/2009 | Crawford et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,631,804 B2 | 12/2009 | Brown |
| 7,650,314 B1 | 1/2010 | Saunders |
| 7,658,324 B2 | 2/2010 | Gindele |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,711,586 B2 | 5/2010 | Aggarwal et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,899,753 B1 | 3/2011 | Everhart |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,132,723 B2 | 3/2012 | Hogg et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |

(56) References Cited

U.S. PATENT DOCUMENTS

| | | |
|---|---|---|
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,769,275 B2 | 7/2014 | Von Mueller et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 10,140,598 B2 | 11/2018 | Faith et al. |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0080183 A1 | 5/2003 | Rajasekaran et al. |
| 2003/0130955 A1 | 7/2003 | Hawthorne |
| 2003/0191709 A1 | 10/2003 | Elston et al. |
| 2003/0191945 A1 | 10/2003 | Keech |
| 2003/0208450 A1 | 11/2003 | Nunez Benito et al. |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen et al. |
| 2004/0260646 A1 | 12/2004 | Berardi et al. |
| 2005/0037735 A1 | 2/2005 | Coutts |
| 2005/0043997 A1* | 2/2005 | Sahota ............... G06Q 20/388 705/16 |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0124756 A1 | 6/2006 | Brown |
| 2006/0161435 A1 | 7/2006 | Atef et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0055630 A1 | 3/2007 | Gauthier et al. |
| 2007/0100754 A1 | 5/2007 | Brown |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0194104 A1 | 8/2007 | Fukuda et al. |
| 2007/0208671 A1* | 9/2007 | Brown ............... G06Q 20/341 705/65 |
| 2007/0245414 A1 | 10/2007 | Chan et al. |
| 2007/0255657 A1 | 11/2007 | Brown |
| 2007/0276765 A1 | 11/2007 | Hazel et al. |
| 2007/0288377 A1 | 12/2007 | Shaked |
| 2007/0291995 A1 | 12/2007 | Rivera |
| 2007/0294182 A1 | 12/2007 | Hammad |
| 2008/0005037 A1 | 1/2008 | Hammad et al. |
| 2008/0015988 A1 | 1/2008 | Brown et al. |
| 2008/0017712 A1 | 1/2008 | Hart et al. |
| 2008/0029593 A1 | 2/2008 | Hammad et al. |
| 2008/0029607 A1 | 2/2008 | Mullen |
| 2008/0034221 A1 | 2/2008 | Hammad et al. |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0040284 A1 | 2/2008 | Hazel et al. |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065553 A1 | 3/2008 | Faith et al. |
| 2008/0065554 A1 | 3/2008 | Hogan et al. |

(56) References Cited

U.S. PATENT DOCUMENTS

| | | |
|---|---|---|
| 2008/0065555 A1 | 3/2008 | Mullen |
| 2008/0071681 A1 | 3/2008 | Khalid |
| 2008/0091617 A1 | 4/2008 | Hazel et al. |
| 2008/0091944 A1 | 4/2008 | von Mueller et al. |
| 2008/0103982 A1 | 5/2008 | Hammad et al. |
| 2008/0189214 A1 | 8/2008 | Mueller et al. |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2008/0319901 A1 | 12/2008 | Brown |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048953 A1 | 2/2009 | Hazel et al. |
| 2009/0048971 A1 | 2/2009 | Hathaway et al. |
| 2009/0060199 A1 | 3/2009 | Von Mueller et al. |
| 2009/0063345 A1 | 3/2009 | Erikson |
| 2009/0070583 A1 | 3/2009 | Von Mueller et al. |
| 2009/0076938 A1 | 3/2009 | Patterson |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0164381 A1 | 6/2009 | Brown |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0027786 A1 | 2/2010 | Faith et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0127083 A1 | 5/2010 | Brown et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0179909 A1 | 7/2010 | Dana |
| 2010/0185545 A1* | 7/2010 | Royyuru .............. G06Q 30/06 705/67 |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |

(56) References Cited

U.S. PATENT DOCUMENTS

| | | |
|---|---|---|
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0081544 A1 | 3/2015 | Schulz et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |

(56) References Cited

U.S. PATENT DOCUMENTS

| | | |
|---|---|---|
| 2016/0197725 A1 | 7/2016 | Hammad |
| 2016/0210628 A1 | 7/2016 | McGuire |
| 2016/0217461 A1 | 7/2016 | Gaddam et al. |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0109745 A1 | 4/2017 | Al-Bedaiwi et al. |
| 2017/0186001 A1 | 6/2017 | Reed et al. |
| 2017/0201520 A1 | 7/2017 | Chandoor et al. |
| 2017/0220818 A1 | 8/2017 | Nagasundaram et al. |
| 2017/0228723 A1 | 8/2017 | Taylor et al. |
| 2017/0295155 A1 | 10/2017 | Wong |
| 2017/0364903 A1 | 12/2017 | Lopez |
| 2018/0006821 A1 | 1/2018 | Kinagi |
| 2018/0075081 A1 | 3/2018 | Chipman |
| 2018/0247303 A1 | 8/2018 | Raj et al. |
| 2018/0262334 A1 | 9/2018 | Hammad |
| 2018/0268405 A1 | 9/2018 | Lopez |
| 2018/0324184 A1 | 11/2018 | Kaja et al. |
| 2018/0324584 A1 | 11/2018 | Lopez |

FOREIGN PATENT DOCUMENTS

| | | | |
|---|---|---|---|
| EP | 2156397 A1 | 2/2010 | |
| WO | 0014648 A1 | 3/2000 | |
| WO | 0135304 A1 | 5/2001 | |
| WO | 0135304 A9 | 5/2002 | |
| WO | 2004042536 A2 | 5/2004 | |
| WO | 2004051585 A2 | 6/2004 | |
| WO | 2005001751 A1 | 1/2005 | |
| WO | 2006113834 A2 | 10/2006 | |
| WO | 2008059465 A2 | 5/2008 | |
| WO | WO-2008059465 A2 * | 5/2008 | ........... G06F 17/602 |
| WO | 2009032523 A1 | 3/2009 | |
| WO | 2010078522 A1 | 7/2010 | |
| WO | 2010135154 A2 | 11/2010 | |
| WO | 2010135154 A3 | 2/2011 | |
| WO | 2012068078 A2 | 5/2012 | |
| WO | 2012098556 A1 | 7/2012 | |
| WO | 2012142370 A2 | 10/2012 | |
| WO | 2012167941 A1 | 12/2012 | |
| WO | 2013048538 A1 | 4/2013 | |
| WO | 2013056104 A1 | 4/2013 | |
| WO | 2013119914 A1 | 8/2013 | |
| WO | 2013179271 A2 | 12/2013 | |

OTHER PUBLICATIONS

"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.

"The Bank Credit Card Business", American Bankers Association, Second Edition, 1996, 246 pages.

U.S. Appl. No. 12/778,638, "Final Office Action", dated May 20, 2015, 10 pages.

U.S. Appl. No. 12/778,638, "Final Office Action", dated Aug. 16, 2013, 18 pages.

U.S. Appl. No. 12/778,638, "Non-Final Office Action", dated Oct. 3, 2014, 10 pages.

U.S. Appl. No. 12/778,638, "Non-Final Office Action", dated Mar. 16, 2012, 17 pages.

U.S. Appl. No. 12/778,638, "Notice of Allowance", dated Jul. 25, 2018, 9 pages.

U.S. Appl. No. 16/171,176, "Non-Final Office Action", dated Jul. 14, 2020, 12 pages.

U.S. Appl. No. 16/171,176, "Notice of Allowance", dated Jan. 14, 2021, 9 pages.

U.S. Appl. No. 16/302,054, "U.S. Patent Application No.", Methods of Distributing Tokens and Managing Token Relationships, Nov. 15, 2018, 46 pages.

U.S. Appl. No. 16/311,144, "U.S. Patent Application No.", Encryption Key Exchange Process Using Access Device, Dec. 18, 2018, 61 pages.

PCT/US2010/034763, "International Preliminary Report on Patentability", dated Dec. 1, 2011, 7 pages.

PCT/US2010/034763, "International Search Report and Written Opinion", dated Dec. 8, 2010, 9 pages.

Sahut, "Internet Payment and Banks", International Journal of Business, vol. 13, Issue 4, 2008, pp. 361-376.

White, "How Computers Work", Que Publishing, Ninth Edition, Nov. 14, 2007,, 53 pages.

* cited by examiner

DEVICE INCLUDING ENCRYPTED DATA FOR EXPIRATION DATE AND VERIFICATION VALUE CREATION

CROSS REFERENCE TO RELATED APPLICATIONS

This application is a continuation of U.S. patent application Ser. No. 16/171,176, filed on Oct. 25, 2018, which is a divisional of U.S. patent application Ser. No. 12/778,638 filed on May 12, 2010, which is a non-provisional of and claims the benefit of the filing date of U.S. Patent Application No. 61/179,970, filed on May 20, 2009, all of which are herein incorporated by reference in its their entirety for all purposes.

BACKGROUND

There is a need for more secure data transfer when paying for goods and services using payment cards such as debit, credit, and stored value cards.

In a typical payment transaction, a user may use a credit card to purchase an item at a merchant. The user may swipe his credit card through a POS (point of sale) terminal, and the POS terminal may generate an authorization request message including the account number, expiration date, and card verification value (CVV) associated with the credit card. The authorization request message may pass to the issuer of the credit card, and the issuer may approve or deny the request to authorize the transaction.

If information such as the account number, expiration date, and card verification value is obtained by an unauthorized person, the unauthorized person could potentially purchase goods and services using the obtained information. Such information could theoretically be intercepted by the unauthorized person during a transaction (e.g., as the account information passes from the merchant to the payment processing network) or it could be surreptitiously obtained from the card while it is with the authorized user.

There is a need for improved data security systems. Embodiments of the invention address these and other problems, individually and collectively.

BRIEF SUMMARY

Embodiments of the invention can alter account information such as an expiration date and/or verification value (e.g., CVV or CVV2) to protect account information.

In some embodiments, in order to make it more difficult to obtain numbers that can be used to conduct fraudulent transactions, a portion of a real account number associated with a payment card can be encrypted. Different segments of the encrypted portion of the real account number can be used to create a new expiration date, a new verification value (e.g., a CVV2 value), and a new account number. The new expiration date, the new verification value, and the new account number can comprise new account information, which can be used instead of real account information to conduct payment transactions.

In some embodiments, when a payment transaction is conducted using the new account information and the payment card, an authorization request message may be generated and the new account information may be sent to a server computer in a payment processing network. The server computer can determine that the received new account information is not the real account information. It can subsequently determine the real account information (including the real account number, the real expiration date, and the real verification value) from the new account information. If the server computer does not make the authorization decision, a modified authorization request message may be generated and then sent to an issuer that issued the real account information. The issuer can then approve or deny the transaction authorization request.

One embodiment of the invention is directed to a method comprising encrypting, using a processor, a portion of a first account number to form an encrypted portion, the first account number being associated with a first expiration date and a first verification value. The method also includes determining a second expiration date or a second verification value using a segment of the encrypted portion.

Another embodiment of the invention is directed to a computer readable medium comprising code, executable by a processor, for implementing a method comprising: encrypting, using a processor, a portion of a first account number to form an encrypted portion, the first account number being associated with a first expiration date and a first verification value; and determining a second expiration date or a second verification value using a segment of the encrypted portion.

Another embodiment of the invention is directed to a method comprising: receiving an initial authorization request message comprising a second account number, and at least one of a second expiration date and a second verification value. After the second account number and at least one of the second expiration date and the second verification value are received, a server computer can determine a first account number, a first expiration date, and a first verification value from the second account number. A modified authorization request message including the first account number, the first expiration date, and the first verification value can be sent to an issuer. The first verification value is different than the second verification value and the first expiration date is different than the second expiration date.

These and other embodiments of the invention are described in further detail below.

DETAILED DESCRIPTION

Embodiments of the invention provide for methods and systems for generating a verification value such as a CVV or CVV2 value, a new second account number, and a new second expiration date from first real account information including a real first account number. Embodiments of the invention can be used for both card present and card-not-present (CNP) transactions.

Embodiments of the invention have a number of advantages. Embodiments of the invention are able to maintain or improve existing user experiences, minimize the impact on merchant processes/systems, leverage existing network data transport mechanisms, utilize an existing issuer validation infrastructure, support multiple forms of implementation, and maintain consistency with a broader authentication strategy. Further, because authentication elements such as expiration dates and the verification values associated with a payment card can change in embodiments of the invention and otherwise appear to be normal to unauthorized persons and can use an encryption process that is not known to the general public, it is difficult, if not impossible, for an unauthorized person to obtain the real account information associated with the user's payment card.

Figure 1:
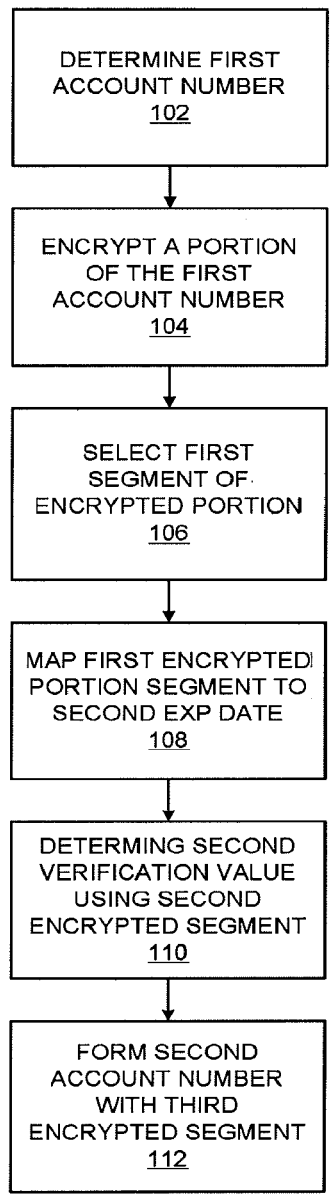
FIG. 1 shows a flowchart illustrating a method according to an embodiment of the invention.

FIG. 1 shows a flowchart illustrating a method according to an embodiment of the invention. The method may be performed by any suitable device (or processor therein), including a device that is located at the transaction site. The device may be operated by a merchant or a user (or consumer).

Referring to FIG. 1, a real first account number can be determined by a processor (step 102). The first account number could be a real first account number associated with a payment card such as a debit or credit card. It may include any suitable number of digits or characters (e.g., 12, 16, 18, etc.). The first account number may be associated with other first account information including an expiration date and a verification value.

The verification value may be a CVV (card verification value) value. There can be two types of CVV values. The first, called CVC1 or CVV1, is encoded on the magnetic stripe of a payment card. The second, called CVC2 or CVV2, is printed on the payment card.

The CVV1 code is used for "in person" transactions, where the consumer using the payment device is physically present at the time of purchase. The consumer hands the merchant his payment card, and the merchant swipes it through a point of sale terminal. Information stored on the magnetic stripe, including the CVV1 code, is read from the magnetic stripe and transmitted to an authenticating entity (e.g., an issuer or a payment processing organization such as Visa) in a purchase transaction for verification (authentication).

However, transactions over the Internet, by mail, fax or over the phone cannot be verified using the CVV1 code. For these so-called "card not present" (GNP) transactions, the merchant will use the CVV2 code to confirm that the consumer is in possession of the authentic card by asking the consumer to state the code over the phone (in a phone transaction) or enter it into a Web page (in an Internet transaction). The CVV2 code is used to authenticate the purchase transaction by comparing the code supplied by the consumer against the code that is stored in a cardholder database at a payment processor facility. If the purchase transaction is authenticated, then an authorization request is sent to the issuer of the card to approve or deny the purchase.

A portion of the first account number can then be encrypted by the processor to form an encrypted portion (step 104). Any suitable number of digits in the first account number may be encrypted using any suitable encryption algorithm. For example, a middle portion of the first account number (e.g., digits 2-11 in a in a sixteen digit account number) may be encrypted using an encryption algorithm such as DES or triple DES. Other types of encryption algorithms may be used in other embodiments of the invention.

A first segment of the encrypted portion of the first account number may then be selected by the processor (step 106). Any suitable number of digits may be present in the first segment, and any suitable portion of the encrypted portion may form the first segment.

Then, the first encrypted portion segment is then mapped to a second expiration date using the processor (step 108). The mapping of the second expiration date to the first encrypted portion segment may occur in any suitable manner. For example, if the first encrypted portion includes two digits, then the numbers from 0-99 in those two digits can be mapped to various expiration dates corresponding to a month (e.g., a number from zero to twelve) and a year (e.g., a two digit number representing a year).

Before or after the first encrypted portion segment is determined by the processor, a second encrypted portion segment of the encrypted portion is used by the processor to determine a second verification value (step 110). The second encrypted portion could be mapped to different verification values stored in a local or remote database, or it could simply be a representation of a new verification value. In the latter case, for example, if the second encrypted portion is "191," then the new second verification value is also "191."

Before or after the first and second encrypted portion segments are determined and/or processed by the processor, a third encrypted portion segment can be determined by the processor. A second account number can then be formed from the third encrypted portion segment (step 112). In the formation of the new second account number, the third encrypted portion segment can be inserted into the middle of a new second account number. In addition to the middle portion comprising the third encrypted portion segment, the new second account number may comprise a signal segment and a segment that is from the real first account number. For example, the second account number may be "4000001234569876." "40000" may be a signal segment, "123456" may be the third encrypted portion segment, and "9876" may be a segment that is unchanged from the real first account number.

The segment that is from the real first account number may be the last four digits of the real account number. It is desirable to keep the last four digits of the real first account number and the new second account number the same, so that the user does not sense that anything is different. For example, when the user receives a receipt for a purchase transaction, the receipt will include the last four digits of the real account number and also the new account number. Typically, only the last four digits of an account number are shown on a purchase receipt, so the user does not see the change in account number and may not notice a difference.

As a result of steps 102, 104, 106, 108, 110, and 112, new second account information can be used by a consumer in a payment transaction. The use of the new second account information is described in further detail below.

In a detailed example illustrating steps 102, 104, 106, 108, 110, and 112, a processor in a smartcard or a POS terminal can determine an existing first account number associated with a payment card and can encrypt a portion of it. In some embodiments, the encryption process may not use dynamic data so the encrypted portion and the second account information derived from it may be used in all transactions conducted with the payment card. However, in other embodiments which are described below, the encrypted portion may be formed using dynamic data such as a date or counter, so that the encrypted portion and consequently the second account information changes periodically (e.g., with every transaction).

The processor can use the encrypted portion to create a new second account number, second expiration date, and second verification value such as a second CVV2 value. For example, an exemplary real first account number could be "4234561234567890," and a new second account number can be generated. The second account number could take the form "40000xxxxxx7890," where the last 4 digits of the second account number are the same as the last four digits of the real first account number. The number "40000" can be a signal segment that can alert a server computer in a payment processing network that the account number is not the real account number and that a decryption process needs to be performed. To fill in the digits "xxxxxx," the processor can take the eleven digits "23456123456" from the real first account number and can apply a DES encryption algorithm (or any other suitable encryption algorithm) and decimalize it to obtain a new eleven digit number. The processor could then take six of these numbers and plug them into the digits "xxxxxx" in the new second account number above. Two of the numbers may be mapped to a four digit expiration date, and the remaining three numbers can be used as a new CVV or CVV2 value. If it is a CVV2 value, then the new CVV2 value would be displayed or otherwise provided to the user so that the user could provide this information to the merchant in a transaction. The new CVV2 value could be displayed on the user's phone, computer, or other device.

Figure 2:
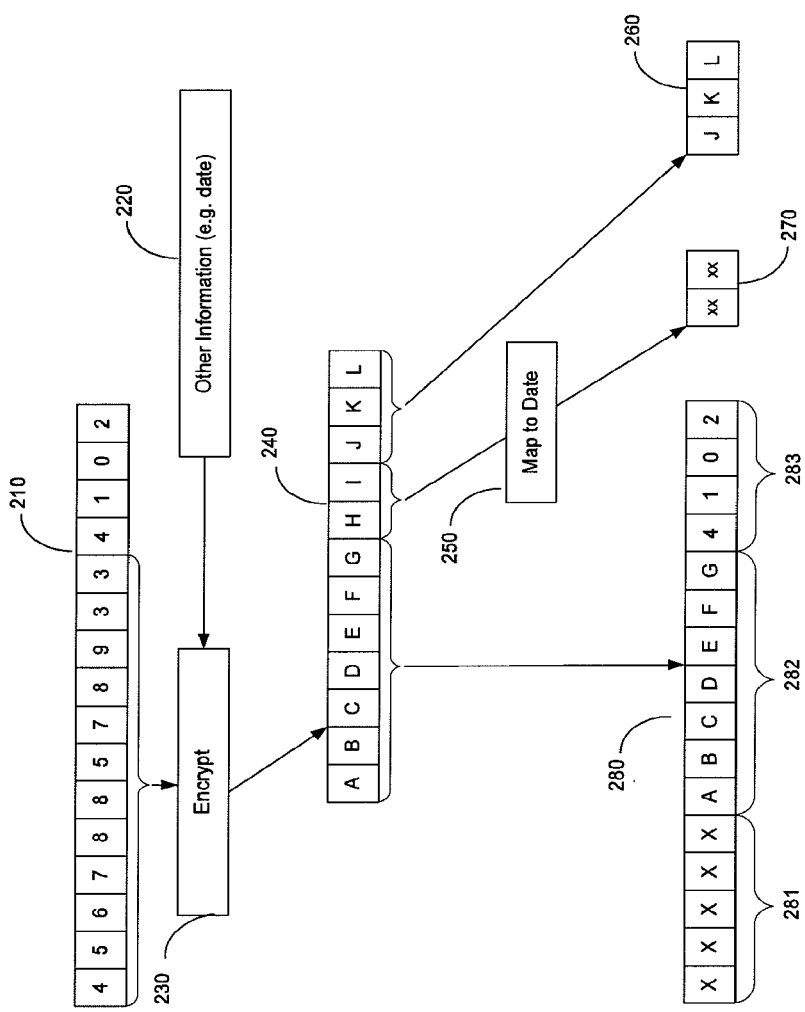
FIG. 2 shows schematic diagram illustrating how a second account number, a second date, and a second verification value can be formed in an embodiment of the invention.

FIG. 2 shows a block diagram illustrating how data is transformed according to embodiments of the invention using other information. Some of the illustrated blocks in FIG. 2 represent blocks of data that may be stored and manipulated in a computer-readable medium, which may be embodied by one or more memory devices. Some of the blocks in FIG. 2 represent various transformations that may take place on the data. The embodiments described with respect to FIG. 2 also include the use of "other information" in the encryption process. The "other information" may include other information that is personal to the user, keys, or dynamic data such as dates, counters, and the like.

Referring to FIG. 2, first account information may include a first account number 210, and may be a primary account number (PAN) that is 16 digits in length. Account numbers of other sizes could be used in embodiments of the invention. The first account number may correspond to a real account number associated with a consumer's payment card. Other first account information may include a first verification value and a first expiration date associated with the payment card.

Other information 220 can represent other data that may be used in combination with first account information 210 according to various embodiments. According to some embodiments, other information 220 can include data that changes on a regular basis. For example, other information 220 might include the current date, counter, the price of a transaction, information that is specific to a merchant, etc. The "other information" may be time dependent in nature, or location or merchant specific.

The other information may also include suitable encryption keys, including symmetric and asymmetric keys, that may be used with the encryption function 230. Suitable symmetric keys may include UDKs ("unique derived keys"). Such keys may be derived from user information such as the user's account number, birthday, social security number, etc., so that each key is unique to a particular user or payment card. The key and encryption algorithm may be previously loaded into the user's portable consumer device (e.g., a smartcard, phone, etc.).

Encryption function 230 can be a function that can take inputs, such as the first account number 210 and the other information 220, and transform the inputs into another value. For example, a portion of the first account number 220 can be encrypted. The output of the encryption function 230 can be represented by an encrypted portion 240. Any suitable encryption function including a DES or triple DES encryption functions can be used in embodiments of the invention.

Segments of the encrypted portion 240 can be used to form the second account information. For instance, the mapping function 250 can map a first segment of the encrypted portion 240 to a month and year value. The month and year value might be used as an expiration date for a credit or debit account in a transaction. The expiration date may be a dynamic second expiration date 270.

Other second account information may be determined from the encrypted portion 240. For example, a new dynamic second verification value 260 can be formed from a second encrypted portion segment of the encrypted portion 240. In another example, a new dynamic second account number 280 can be formed with a third encrypted portion segment.

As illustrated in FIG. 2, the new dynamic second account number 280 can be been broken up into three distinct segments including a static signal segment 281, an encrypted account number segment 282, and actual account number digits 283.

According to one embodiment, a new dynamic second verification value 260, a second dynamic account number 280, and a second dynamic expiration date 270 are created from a consumer's first account number 210 by first selecting the digits from the consumer's account number 210 that can serve as the basis for the dynamic numbers. In FIG. 2, the first twelve numbers of the first account number 210 are selected. Other embodiments may use a different combination of numbers from the first account number 210.

Once digits from the first account number 210 have been selected, other information 220 is selected that will be used to help create the second dynamic card verification value 260, the second dynamic account number 280, and the second dynamic expiration date 270. According to one embodiment, at least a portion of the other information 220 is selected so that both the entity encoding the data (e.g., a processor in a POS terminal, a smartcard, etc.) and the entity decoding the data (e.g., a processor in a server computer remotely located from the point of sale) will know the value of the other information 220 without explicitly transmitting the other information 220 between the entities. For example, the current date could be used as a part of the other information 220. The entities encoding and decoding the data can have a mutual understanding that the other information 220 will comprise at least the current date, and both parties can use this information appropriately. Alternatively or additionally, the other information 220 may use a mutually agreed upon piece of data that will be transmitted as a part of a transaction. For example, the other data might include the price of the transaction or a merchant ID number. Many other possibilities for the value of the other information 220 also exist.

Once portions of the account number 210 and the other information 220 are selected, the encryption function 230 can be used to encrypt the portions of the account number 210 using other information 220 to produce the encrypted portion 240. The encrypted portion 240 can then be used, potentially along with other data, to generate the dynamic second account number 280, the dynamic second expiration date 270, and the dynamic second verification value 260.

In the embodiment illustrated in FIG. 1, a second dynamic account number 280 is created as a combination of a number of pieces of data. A static signal segment 281 can be inserted into the second dynamic account number 280 and can be used to communicate information about how the data was encoded. For example, a static signal segment 281 comprising "11111" might indicate to an authenticating entity that the received account number is not the real first account number, but is a new second account number. Alternatively or additionally, the static signal 281 might indicate additional information about the information that is transmitted, such as the encryption function 230 that was used, the type of other information used 220, how the dynamic data 240 was used to populate the various dynamic fields, etc.

The second dynamic account number 280 can also use segments of the encrypted portion 240. In the embodiment illustrated in FIG. 2, the first seven digits of the encrypted portion 240 is inserted into the middle of the dynamic account number 282. In some embodiments, this insertion of data helps to insure that the dynamic account number 280 changes on a regular basis for a given account number 210.

The second dynamic account number 280 may also contain portions of the actual first account number 210. For example, in the embodiment illustrated in FIG. 2, the last four digits of the actual account number 210 are placed at the end of the dynamic account number 283.

Portions of the encrypted portion 240 can also be used to create a dynamic second expiration date 270. In the example shown in FIG. 2, the $8^{th}$ and $9^{th}$ digits of the encrypted portion 240 are used as the input into a function that maps the $8^{th}$ and $9^{th}$ digits to an expiration date. For example, the $8^{th}$ and $9^{th}$ digits, taken together, might correspond to a number range spanning "00" to "99." Each of these 100 different values can then be mapped to a specific month and year combination that might be used as an expiration date.

Portions of the encrypted portion 240 can also be used as a dynamic CVV2 value 260 (or other verification value). As shown in FIG. 2, the last three digits of the encrypted portion 240 are used as the CVV2 value 260.

Once the dynamic account number 280, dynamic expiration date 270, and dynamic CVV2 260 have been created, this dynamically generated data can be used as the payment data used to conduct a transaction. The dynamically generated data can thus take the place of the actual first account number 210, first expiration date, or first CVV2 value associated with the payment card of the consumer. Note that in some embodiments, the real account information such as the real account number may be displayed to the user (e.g., embossed on a card), but the second derived account information may not be visible or displayed to the user, but may be transmitted to the issuer instead of the real first account information.

An entity wishing to decode the actual first account number 210 for an account from the dynamically generated data (e.g., a server computer in a payment processing network or at an issuer), would typically need to know how the dynamic account number 280, dynamic expiration date 270, and dynamic CVV2 field 260 were created in order to extract the actual information out of the dynamic fields. An entity that knows precisely how the dynamic data is generated could undo the transformation to extract the actual first account number 210, but any entity that did not know how this information was assembled would not be able to extract useable account data out of the dynamic data. Furthermore, the dynamic data could regularly change for each use of the account number, based on how the other information 220 changed.

The embodiment illustrated in FIG. 2 can have many different variations as will be apparent to one skilled in the art. For example, the precise manner in which the encrypted portion 240 is used to populate the dynamic fields, or the precise digits from the first account number 210 used to create the encrypted portion 240 can all be varied according to various embodiments.

The processes described above may be implemented by a processor in a portable consumer device (e.g., a payment card), access device, or any other device involved in a transaction. The steps of the methods that are described above may be carried out by a processor executing computer-executable code residing on a computer-readable medium in any one of these devices.

I. Exemplary Systems

Figure 3:
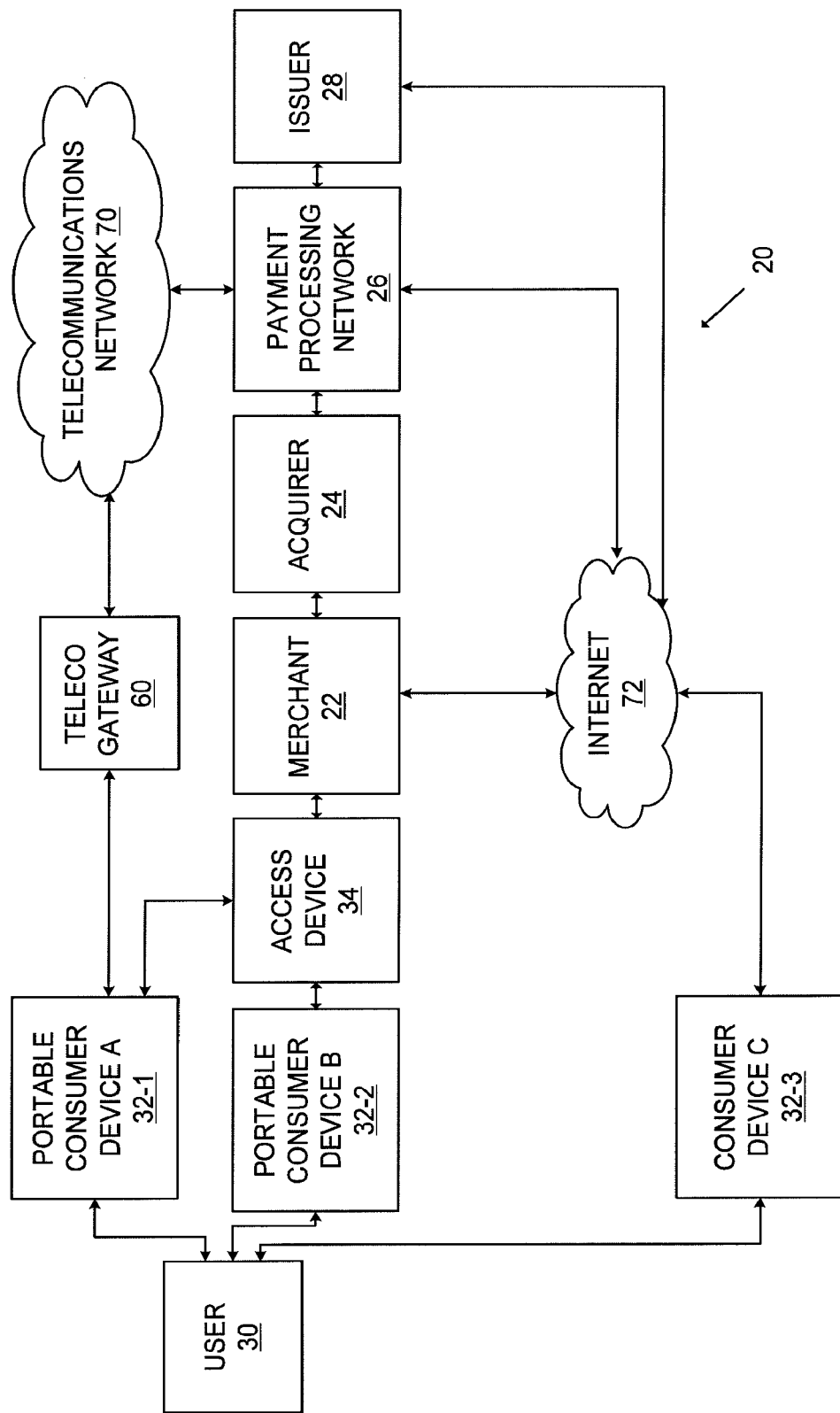
FIG. 3 shows a block diagram of a system.

A system according to an embodiment of the invention is shown in FIG. 3.

FIG. 3 shows a system 20 that can be used in an embodiment of the invention. The system 20 includes a merchant 22 and an acquirer 24 associated with the merchant 22. In a typical payment transaction, a consumer such as user 30 may purchase goods or services at the merchant 22 using a portable consumer device such as portable consumer device B 32-2 (or portable consumer device A 32-1 or consumer device 32-3). The user 30 may be an individual, or an organization such as a business that is capable of purchasing goods or services. The acquirer 24 can communicate with an issuer 28 via a payment processing network 26.

As used herein, an "issuer" is typically a business entity (e.g., a bank) which maintains financial accounts for the user and often issues a portable consumer device such as a credit or debit card to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Embodiments of the invention encompass such single entity issuer-acquirers.

In FIG. 3, user 30 can use one or more different types of portable consumer devices including consumer device A 32-1 and portable consumer device B 32-2. In one example, consumer device A 32-1 may be in the form of a phone, while portable consumer device B 32-2 may be in the form of a card. The consumer device A 32-1 may consequently be used to communicate with the issuer 28 via a telecommunications gateway 60, a telecommunications network 70, and a payment processing network 26. The different consumer devices A 32-1 and B 32-2 could be linked to the same issuer account number, or could be linked to respectively different issuer account numbers. User 30 may also use a consumer device 32-3 such as a personal computer to communicate with the payment processing network 26 and/or the merchant 22 via the Internet 72.

The consumer devices according to embodiments of the invention may be in any suitable form. In some embodiments, the consumer devices are portable in nature and may be portable consumer devices. Suitable portable consumer devices can be hand-held and compact so that they can fit into a user's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

Each consumer device may comprise a body, and a memory comprising a computer readable medium disposed on or within the body. In addition, the consumer device may also include a processor coupled to the memory, where greater functionality and/or security are desired. The computer readable medium may comprise code, executable by a processor, for implementing a method comprising: encrypting, using a processor, a portion of a first account number to form an encrypted portion, the first account number being associated with a first expiration date and a first verification value; and determining a second expiration date or a second verification value using a segment of the encrypted portion.

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Figure 4:
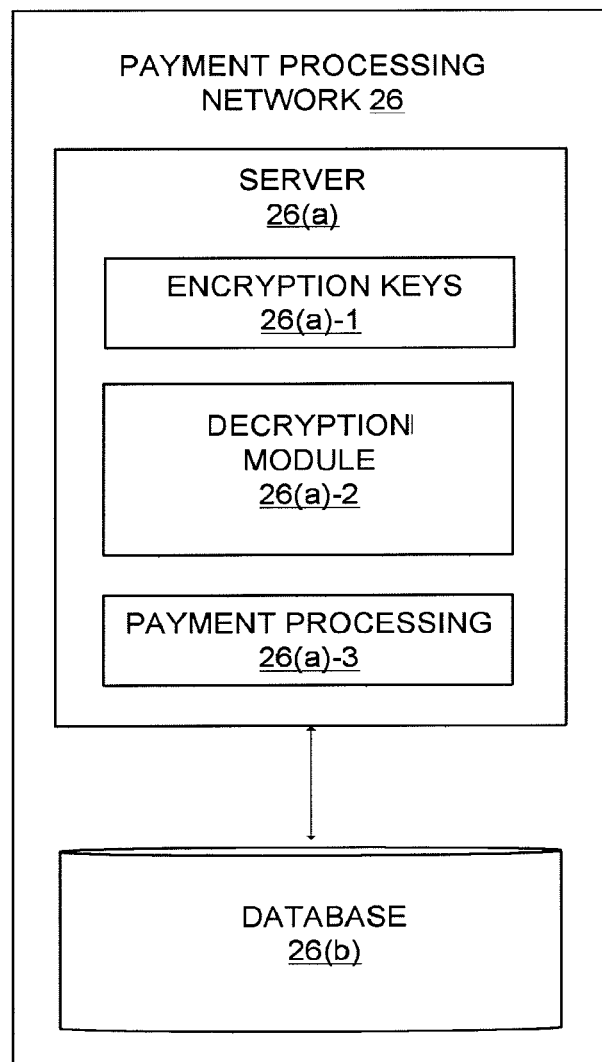
FIG. 4 shows a block diagram of parts of a payment processing system.

Referring to FIG. 4, the payment processing network 26 may include a server computer 26(a), and a database 26(b) operatively coupled to the server computer 26(a). A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The server computer 26(a) in the payment processing network 26 may comprise code, executable by a processor, for implementing a method comprising: receiving an initial authorization request message comprising a second account number, and at least one of a second expiration date and a second verification value; determining, using a server computer, a first account number, a first expiration date, and a first verification value from the second account number; and sending a modified authorization request message to an issuer, wherein the modified authorization request message comprises the first account number, the first expiration date, and the first verification value, wherein the first verification value is different than the second verification value and the first expiration date is different than the second expiration date.

The database 26(b) may store any suitable type of information. Suitable information that may be stored in the database 26(b) may include a lookup table linking first expiration dates with first encrypted portion segments, as well as other information.

The server computer 26(a) may also comprise a number of functional modules and data elements. They may include encryption keys 26(a)-1, a decryption module 26(a)-2, and a payment processing module 26(a)-3. Each of these modules may comprise any suitable combination of hardware and/or software to accomplish the functions described herein.

The payment processing module 26(a)-3 may comprise appropriate logic to process electronic payments. For example, the payment processing module 26(a)-3 may include an authorization sub-module for receiving and passing authorization request messages to appropriate issuers for approval. It may also include a clearing and settlement sub-module for clearing and settling transactions between different issuers and acquirers.

Referring again to FIG. 3, the merchant 22 may also have, or may receive communications from, an access device 34 that can interact with the portable consumer devices 32-1, 32-2. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRB), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

II. Exemplary Methods

Figure 5:
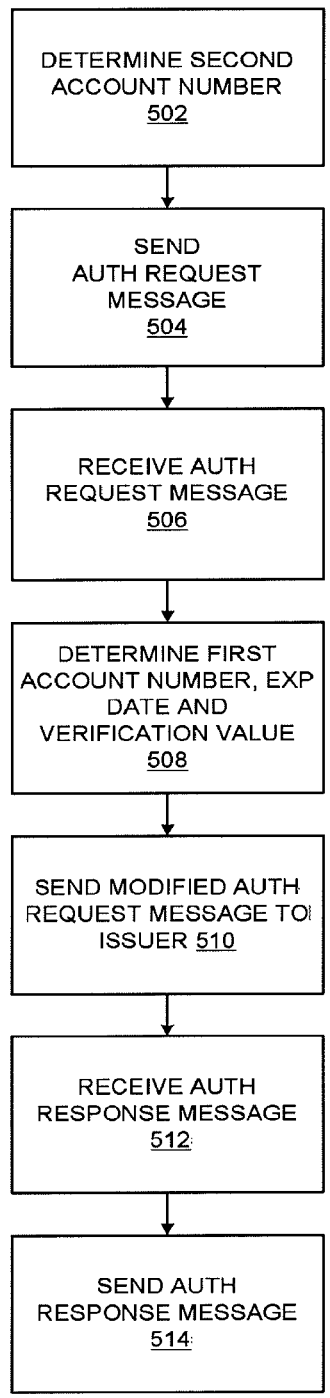
FIG. 5 shows a flowchart illustrating a process for using a second account number, a second expiration date, and a second verification value.

Methods according to embodiments of the invention can be described with reference to FIGS. 3-5. Although specific sequences of steps are described, it is understood that embodiments of the invention are not limited to the order of the specific steps described, and that any suitable combination of steps may be included in embodiments of the invention.

Referring to FIG. 3, the user 30 may conduct a transaction with a merchant 22. The transaction may be conducted in person, or may be conducted via the Internet 72.

In a typical in person purchase transaction, the user 30 purchases a good or service at the merchant 22 using a portable consumer device such as portable consumer device A 32-1, which may be in the form of a credit card, or portable consumer device B 32-2, which may be in the form of a phone. For instance, the user's portable consumer device A 32-a can interact with an access device 34 such as a POS (point of sale) terminal at the merchant 22. For example, the user 30 may take the credit card and may swipe it through an appropriate slot in the POS terminal. Alternatively, the POS terminal may be a contactless reader, and the portable consumer device B 32-2 may be a contactless device such as a contactless card.

In a typical Internet transaction, the user 30 may use his consumer device C 32-3 and may contact the Web site of the merchant 22 via the Internet 72. The user 30 may select goods for purchase and may enter information onto the Web site including payment card information. As described above, the merchant 22 may then request authorization of the transaction from the issuer 28, and a clearing and settlement process may be performed after the authorization process is performed.

Before an authorization request message is forwarded to the acquirer 24, a processor in any of the consumer devices A 32-1, B 32-2, or C 32-3, or in the access device 34, can determine the second account information from the real first account information (as described above). This second account information may include a second account number, a second expiration date, and a second verification value such as a second CVV2 value. This second account information may be derived from a real first account number (step 502).

After the second account information is determined, an authorization request message is then forwarded to the acquirer 24 (step 504).

After receiving the authorization request message (step 506), the authorization request message is then sent to the payment processing network 26. The server computer 26(*a*) in the payment processing network 26 then determines that the received second account number is not the user's real account information after analyzing the signal segment in the second account number. It then determines the first account number, the expiration date, and the verification value associated with the received second account information. It can use the decryption module 26(*a*)-2 and an appropriate key or keys 26(*a*)-1 to do this (step 508). After the server computer 26(*a*) determines the real first account information, the payment processing network 26 (or the server computer located therein) then generates a modified authorization request message including the first account information and then forwards it to the issuer 28 for approval if it does not make the authorization decision (step 510).

After the issuer 28 receives the authorization request message, the issuer 28 then responds with an authorization response message indicating whether or not the transaction is authorized, and the authorization response message is received at the payment processing network 26 and is forwarded back to the acquirer 24 (steps 512 and 514). The acquirer 24 then sends the response message back to the merchant 22.

After the merchant 22 receives the authorization response message, the access device 34 at the merchant 22 may then provide the authorization response message for the consumer 30. The response message may be displayed by the access device 34, or may be printed out on a receipt.

At the end of the day, a normal clearing and settlement process can be conducted by the transaction processing system 26. A clearing process is a process of exchanging financial details between and acquirer and an issuer to facilitate posting to a consumer's account and reconciliation of the consumers settlement position. Clearing and settlement can occur simultaneously.

Figure 6:
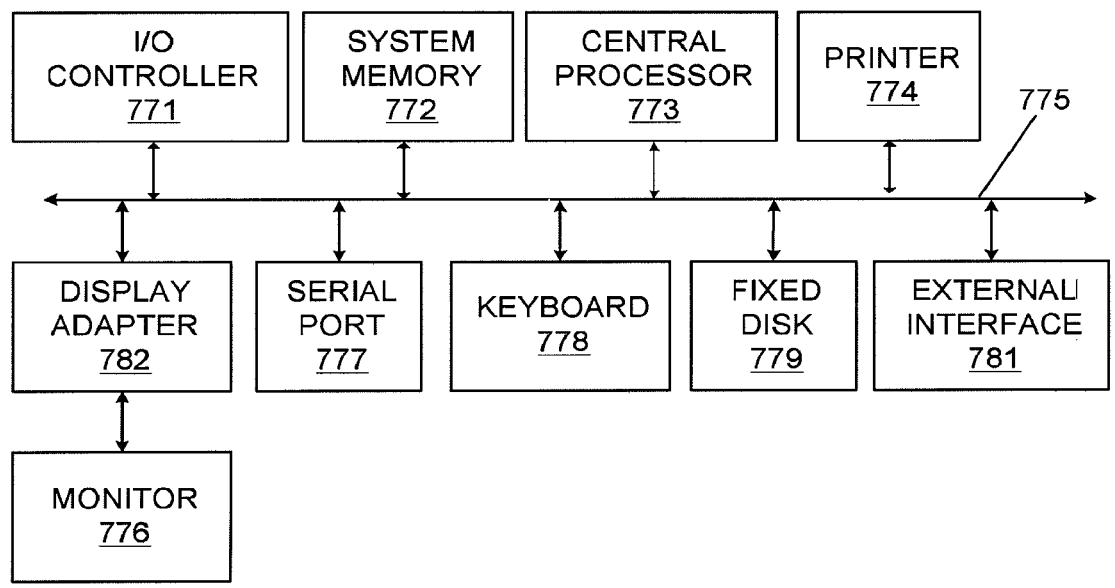
FIG. 6 shows a block diagram of components in a computer apparatus according to various embodiments.
Figure 7:
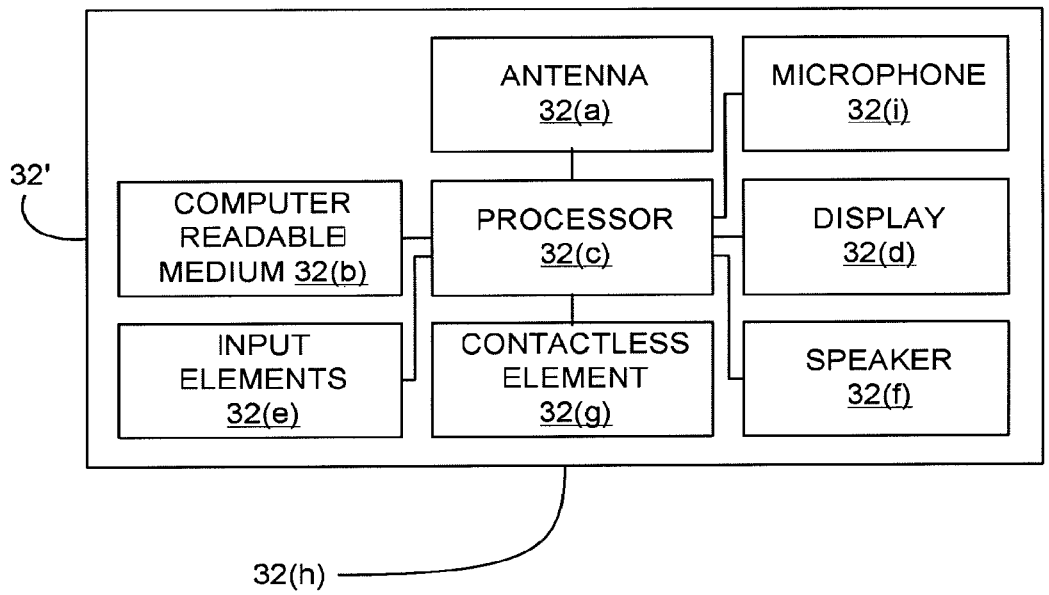
FIGS. 7 and 8 show block diagrams illustrating components in consumer devices according to various embodiments.
Figure 8:
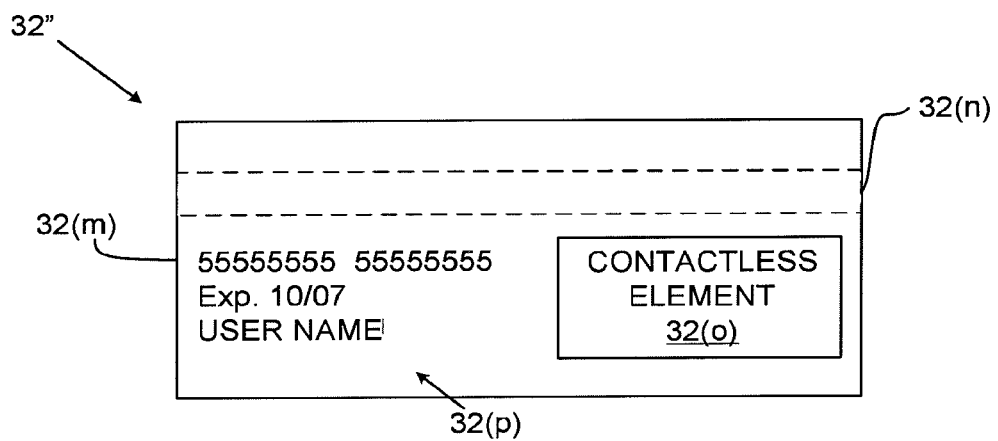

FIGS. 6, 7, and 8 show block diagrams of consumer devices, computer devices and subsystems that may be present in computer apparatuses in systems according to embodiments of the invention.

The various participants and elements may operate one or more computer apparatuses to facilitate the functions described herein. Examples of such subsystems or components are shown in FIG. 6. The subsystems shown in FIG. 6 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

A consumer device may be in any suitable form. For example, suitable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of consumer devices include cellular phones (e.g., the phone 34 described above), personal digital assistants (PDAs), pagers, payment cards, security cards, access cards, smart media, transponders, and the like. The consumer devices can also be debit devices (e.g., a debit card), credit devices (e.g., a credit card), or stored value devices (e.g., a stored value card). Other consumer devices may include personal computers, laptops, or other devices capable of communicating over the internet.

An exemplary consumer device 32' in the form of a phone may comprise a computer readable medium and a body as shown in FIG. 7. (FIG. 7 shows a number of components, and the consumer devices according to embodiments of the invention may comprise any suitable combination or subset of such components.) The computer readable medium may be present within the body 32(*h*), or may be detachable from it. The body 32(*h*) may be in the form a plastic substrate, housing, or other structure. The computer readable medium 32(*b*) may be a memory that stores data and may be in any suitable form including a magnetic stripe, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The consumer device 32 may further include a contactless element 32(*g*), which is typically implemented in the form of a semiconductor chip (or other data storage element) with an associated wireless transfer (e.g., data transmission) element, such as an antenna. Contactless element 32(*g*) is associated with (e.g., embedded within) consumer device 32 and data or control instructions transmitted via a cellular network may be applied to contactless element 32(*g*) by means of a contactless element interface (not shown). The contactless element interface functions to permit the exchange of data and/or control instructions between the mobile device circuitry (and hence the cellular network) and an optional contactless element 32(*g*).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the consumer device 32 and an interrogation device. Thus, the consumer device 32 is capable of communicating and transferring data and/or control instructions via both cellular network and near field communications capability.

The consumer device 32 may also include a processor 32(c) (e.g., a microprocessor) for processing the functions of the consumer device 32 and a display 32(d) to allow a consumer to see phone numbers and other information and messages. The consumer device 32 may further include input elements 32(e) to allow a consumer to input information into the device, a speaker 32(f) to allow the consumer to hear voice communication, music, etc., and a microphone 32(i) to allow the consumer to transmit her voice through the consumer device 32. The consumer device 32 may also include an antenna 32(a) for wireless data transfer (e.g., data transmission).

If the consumer device is in the form of a debit, credit, or smartcard, the consumer device may also optionally have features such as magnetic strips. Such devices can operate in either a contact or contactless mode.

An example of a consumer device 32" in the form of a card is shown in FIG. 2B. FIG. 2B shows a plastic substrate 32(m). A contactless element 32(o) for interfacing with an access device 34 may be present on or embedded within the plastic substrate 32(m). Consumer information 32(p) such as an account number, expiration date, and consumer name may be printed or embossed on the card. Also, a magnetic stripe 32(n) may also be on the plastic substrate 32(m).

As shown in FIG. 8, the consumer device 32" may include both a magnetic stripe 32(n) and a contactless element 32(o). In other embodiments, both the magnetic stripe 32(n) and the contactless element 32(o) may be in the consumer device 32". In other embodiments, either the magnetic stripe 32(n) or the contactless element 32(o) may be present in the consumer device 32".

Embodiments of the invention are not limited to the above-described embodiments. For example, although separate functional blocks are shown for an issuer, payment processing system, and acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, appendixes, and descriptions mentioned above are herein incorporated by reference in their entirety for all purposes. None is admitted to be prior art.

What is claimed is:

1. A method, comprising:
receiving, using a server computer, an initial authorization request message comprising a second account number, and a second expiration date or a second verification value, the second account number, and the second expiration date or the second verification value being utilized in place of a first account number, and a first expiration date or a first verification value, respectively, the initial authorization request message being part of a transaction with respect to an account corresponding to the first account number, the second account number determined based at least in part on a first segment of an encrypted account number portion and a remaining portion of the first account number, the encrypted account number portion being formed at least in part by encrypting a first portion of the first account number, the first portion having less digits than the whole first account number, the remaining portion corresponding to an unencrypted portion of the first account number, the second expiration date determined based at least in part on a second segment of the encrypted account number portion, the second verification value determined based at least in part on a third segment of the encrypted account number portion;
determining the first account number, and the first expiration date or the first verification value based at least in part on the second account number, and the second expiration date or the second verification value; and
sending a modified authorization request message to an issuer, wherein the modified authorization request message comprises the first account number, and the first expiration date or the first verification value;
wherein (i) each segment of the encrypted account number portion contains less information than the whole encrypted account number portion and (ii) the first segment, and the second segment or the third segment of the encrypted account number portion form at least part of the whole encrypted account number portion.

2. The method of claim 1, wherein the initial authorization request message comprises the second expiration date, and wherein determining the second expiration date comprises determining the second expiration date at least in part by mapping the second segment of the encrypted account number portion to a date.

3. The method of claim 1, wherein the second account number comprises a signal segment, the third segment of the encrypted account number portion, and the unencrypted portion of the first account number, the signal segment of the second account number indicating that the second account number includes an encrypted portion.

4. The method of claim 1, wherein the unencrypted portion of the first account number is incorporated into the second account number.

5. The method of claim 1, wherein the second account number comprises a signal segment, which informs the server computer to generate the modified authorization request message.

6. The method of claim 1, wherein the first account number, the first expiration date, and the first verification value are associated with a debit or credit card.

7. The method of claim 1, wherein determining the first account number is a credit card number or a debit card number.

8. A computer apparatus comprising:
a processor; and
a computer readable medium comprising code, executable by at least one processor, for implementing a method comprising:
receiving an initial authorization request message comprising a second account number, and a second expiration date or a second verification value, the second account number, and the second expiration date or the second verification value being utilized in place of a first account number, a first expiration date or a first verification value, respectively, the initial authorization request message being part of a transaction with respect to an account corresponding to the first account number, the second account number determined based at least in part on a first segment of an encrypted account number portion and a remaining portion of the first account number, the encrypted account number portion being formed at least in part by encrypting a first portion of the first account number, the first portion having less digits than the whole first account number, the remaining portion corresponding to an unencrypted portion of the first account number, the second expiration date determined based at least in part on a second segment of the encrypted account number portion, the second verification value determined based at least in part on a third segment of the encrypted account number portion;
determining the first account number, and the first expiration date or the first verification value based at least in part on the second account number, and the second expiration date or the second verification value; and
sending a modified authorization request message to an issuer, wherein the modified authorization request message comprises the first account number, and the first expiration date or the first verification value;
wherein (i) each segment of the encrypted account number portion contains less information than the whole encrypted account number portion and (ii) the first segment, and the second segment or the third segment of the encrypted account number portion form at least part of the whole encrypted account number portion.

9. The computer apparatus of claim 8, wherein determining the second expiration date comprises determining the second expiration date at least in part by mapping the second segment of the encrypted account number portion to a date.

10. The computer apparatus of claim 8, wherein the second account number comprises a signal segment, the third segment of the encrypted account number portion, and the unencrypted portion of the first account number, the signal segment of the second account number indicating that the second account number includes an encrypted portion.

11. The computer apparatus of claim 8, wherein the unencrypted portion of the first account number is incorporated into the second account number.

12. The computer apparatus of claim 8, wherein the second account number comprises a signal segment, which informs the computer apparatus to generate the modified authorization request message.

13. The computer apparatus of claim 8, wherein the first account number, the first expiration date, and the first verification value are associated with a debit or credit card.

14. The computer apparatus of claim 8, wherein determining the first account number, the first expiration date and the first verification value is based at least in part on the second account number, the second expiration date and the second verification value comprises undoing one or more operations utilized to determine the second account number, the second expiration date and the second verification value based at least in part on the first account number, the first expiration date and the first verification value.

15. A method comprising:
encrypting, using a processor, a first portion of a first account number, the first portion having less digits than the whole first account number, to form an encrypted account number portion, while leaving a remaining portion of the first account number unencrypted, the first account number being associated with a first expiration date and a first verification value;
determining a second account number based at least in part on a first segment of the encrypted account number portion and the remaining portion of the first account number;
determining a second expiration date based at least in part on a second segment of the encrypted account number portion, or determining a second verification value based at least in part on a third segment of the encrypted account number portion; and
participating in a transaction with respect to an account corresponding to the first account number utilizing the determined second account number, and the determined second expiration date or the determined second verification value in place of the first account number, and the first expiration date or the first verification value,
wherein (i) each segment of the encrypted account number portion contains less information than the whole encrypted account number portion and (ii) the first segment, and the second segment or the third segment of the encrypted account number portion form at least a portion the whole encrypted account number portion.

16. The method of claim 15 wherein the second expiration date is determined and determining the second expiration date comprises determining the second expiration date at least in part by mapping the second segment of the encrypted account number portion to a date.

17. The method of claim 15, wherein the second account number comprises a signal segment, the third segment of the encrypted account number portion, and the unencrypted portion of the first account number, the signal segment of the second account number indicating that the second account number includes an encrypted portion.

18. The method of claim 15, wherein the unencrypted portion of the first account number is incorporated into the second account number and the unencrypted portion consists of exactly four digits.

19. The method of claim 15, wherein the processor is in a portable consumer device.

20. The method of claim 15, wherein the first account number is a credit card number or a debit card number.

\* \* \* \* \*